Figure 1:
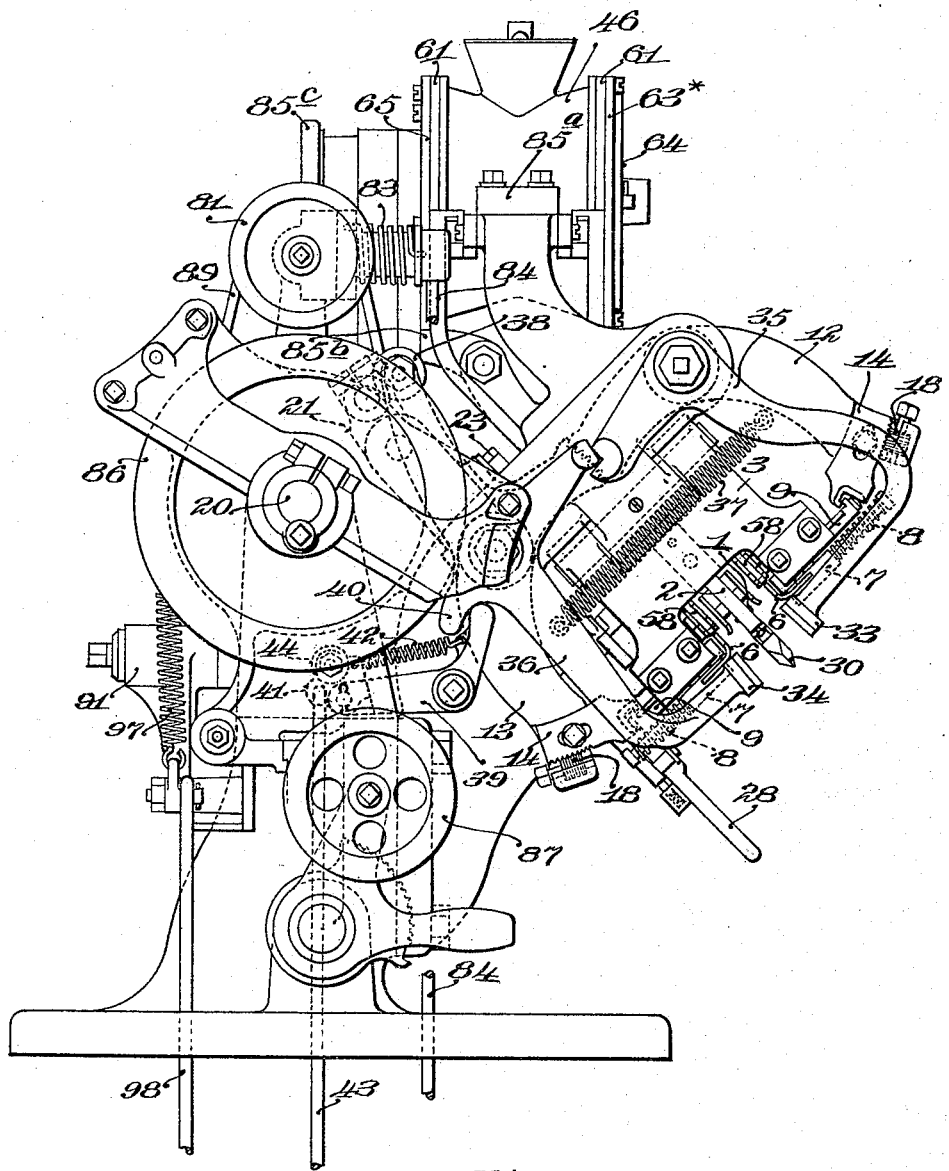

G. GODDU.
MACHINE FOR SETTING FASTENERS.
APPLICATION FILED JULY 27, 1905.

1,217,088.

Patented Feb. 20, 1917.
8 SHEETS—SHEET 1.

Witnesses
Edward S. Day
Farnum F. Dorsey

Inventor
George Goddu
his Attorneys
Phillips Van Everen & Fish

G. GODDU.
MACHINE FOR SETTING FASTENERS.
APPLICATION FILED JULY 27, 1905.

1,217,088.

Patented Feb. 20, 1917.
8 SHEETS—SHEET 2.

Witnesses
Edward S. Day
Farnum F. Dorsey

Inventor
George Goddu
by his Attorneys
Phillips Van Everen & Fish

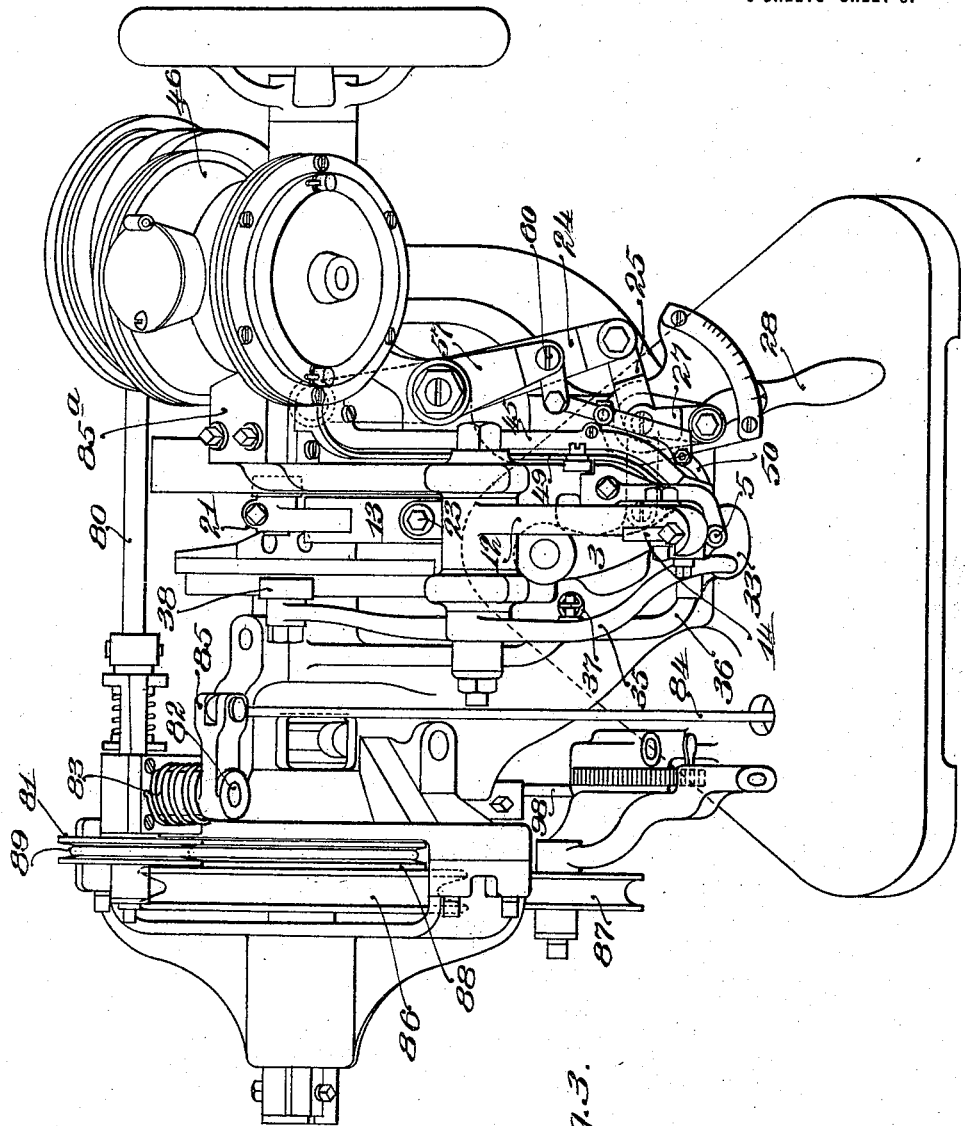

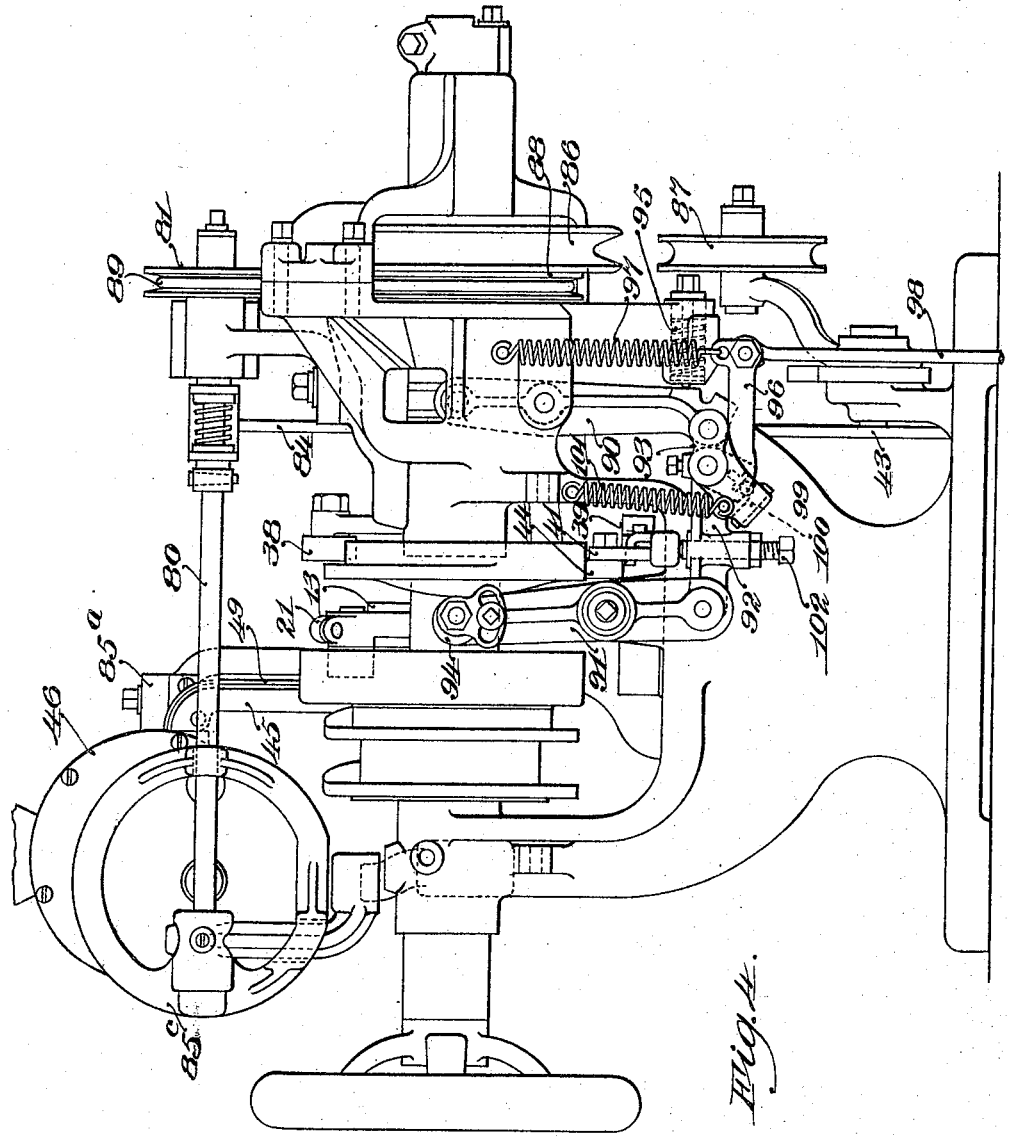

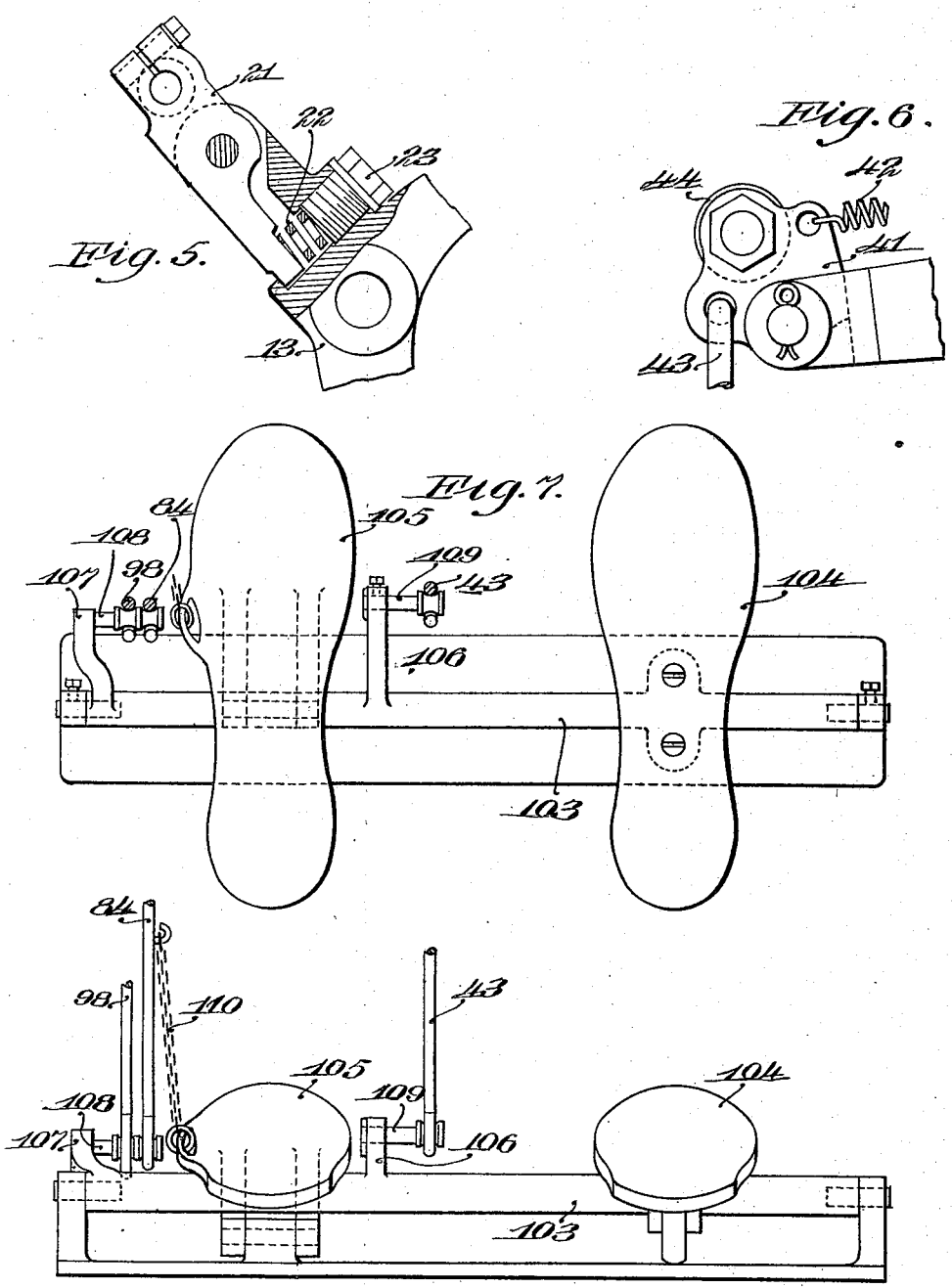

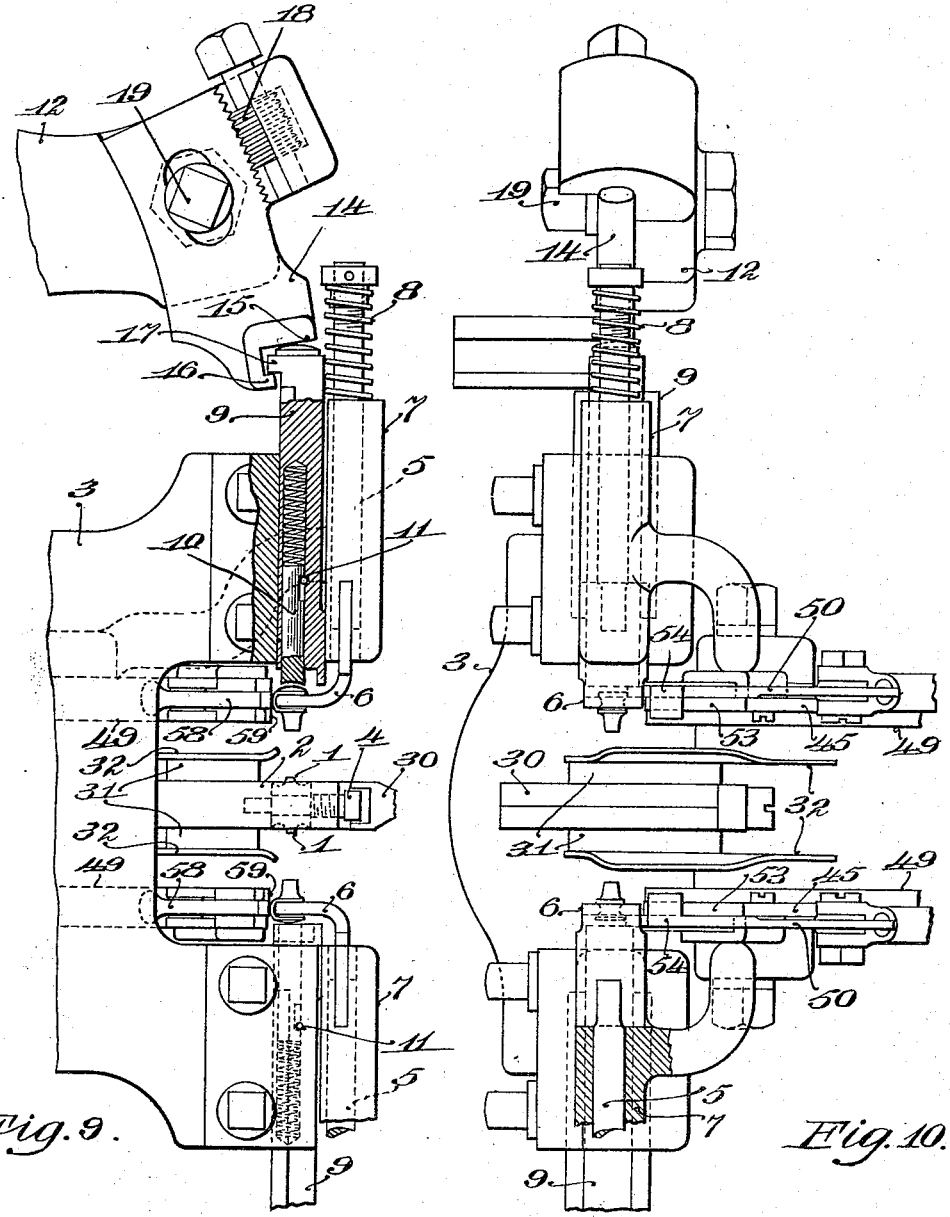

G. GODDU.
MACHINE FOR SETTING FASTENERS.
APPLICATION FILED JULY 27, 1905.

1,217,088.

Patented Feb. 20, 1917.
8 SHEETS—SHEET 7.

Witnesses
Edward S. Day
Farnum F. Dorsey

Inventor
George Goddu
by his Attorneys
Phillips Van Everen & Fish

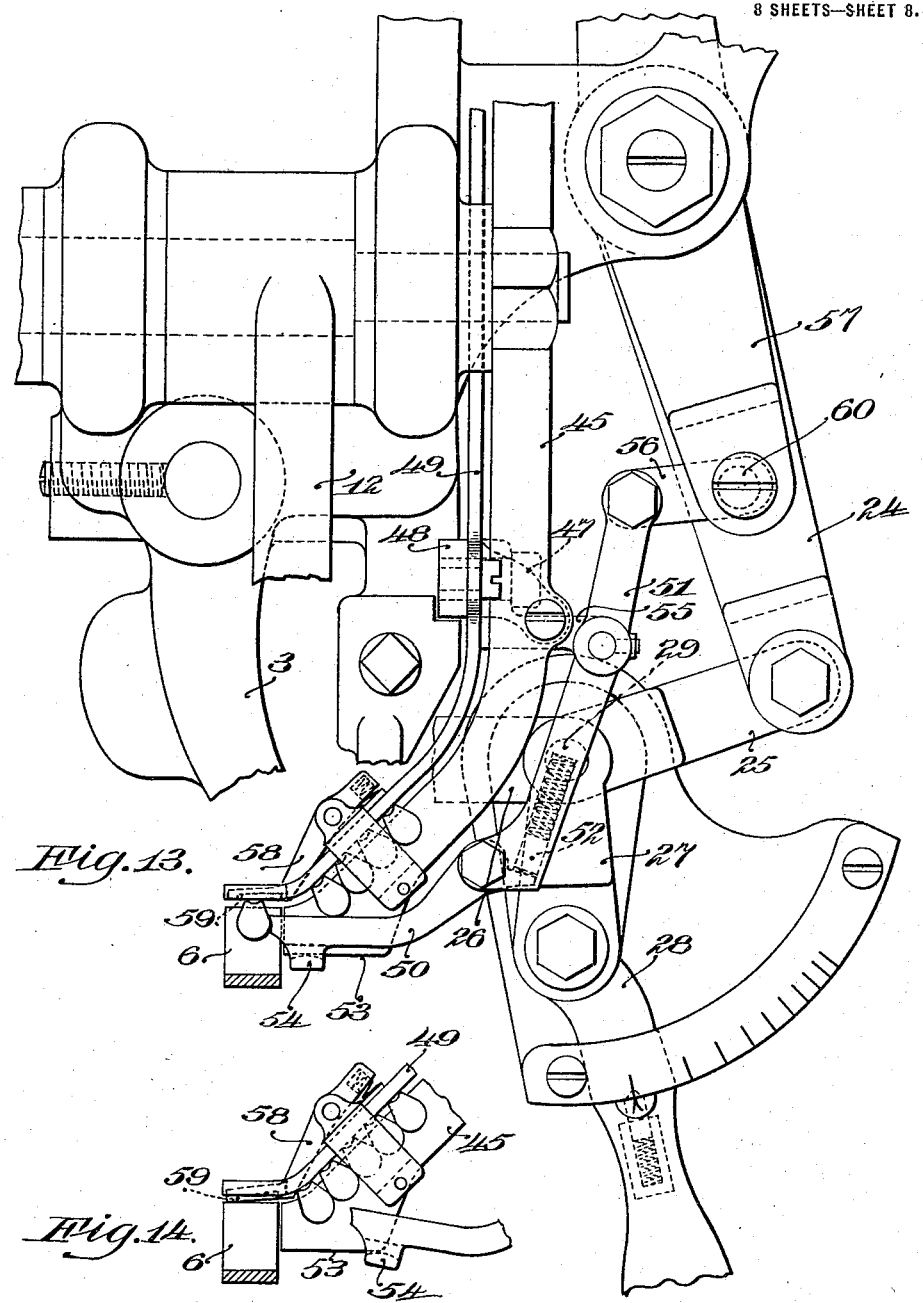

UNITED STATES PATENT OFFICE.

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR SETTING FASTENERS.

1,217,088.  Specification of Letters Patent.  Patented Feb. 20, 1917.

Application filed July 27, 1905. Serial No. 271,426.

*To all whom it may concern:*

Be it known that I, GEORGE GODDU, a citizen of the United States, residing at Winchester, in the county of Middlesex and State of Massachusetts, have invented certain new and useful Improvements in Machines for Setting Fasteners; and I do hereby declare the following to be a full, clear, and exact description of the invention, such as will enable others skilled in the art to which it appertains to make and use the same.

The present invention relates to machines for setting fasteners, and more particularly to machines for setting lacing hooks, although certain features of the invention are also applicable to machines for setting other forms of fasteners, such, for instance, as studs, eyelets or rivets.

An object of the present invention is to provide an improved machine for setting lacing hooks adapted to set hooks in two oppositely disposed layers of material, such, for instance, as the opposite sides of a shoe upper.

Another object of the invention is to provide an improved mechanism for actuating the work-holding clamps of fastener setting machines.

Other objects of the invention are to improve the construction, arrangement and mode of operation of the setting dies and the work-feeding and hook-feeding mechanism of lacing hook setting machines.

With these objects in view, a feature of the present invention consists in the provision in a machine for setting lacing hooks, of reversely arranged up-setting dies adapted to be located between two layers of material, hook-setting dies coöperating therewith to set the lacing hooks, and means for delivering a hook into the required position between each up-setting die and its coöperating hook-setting die. In the machine hereinafter described as embodying the various features of the present invention, the hooks are set successively on each layer of material, and in order to feed the work to properly space the hooks, the up-setting dies are moved laterally. This lateral feeding movement of the up-setting dies in a machine adapted to set hooks upon two layers of material, is believed to be new and constitutes a feature of the present invention.

That feature of the present invention which relates to improved mechanism for actuating the work-holding clamps contemplates the provision of automatic mechanism for actuating the clamps to hold the work during the operation of the setting dies, and to release the work while the work is being fed, and automatic mechanism under the control of the operator for actuating the clamps to allow work to be removed from and inserted in the machine. This feature of the invention is not limited to use in connection with machines for setting lacing hooks, but may be used in connection with machines for setting other forms of fasteners.

Other features of the present invention are limited to use in connection with hook-setting machines, and consist in certain improved constructions and arrangements of the hook-setting dies and of the mechanism for separating hooks from the raceways and delivering them to the dies and for feeding the work to space the hooks. These features of the invention are not, however, limited to use in hook-setting machines adapted to set hooks in two layers of material, except where such limitations are expressly stated in the claims.

Other features of the present invention consist in certain devices, combinations and arrangements of parts hereinafter described and claimed, the advantages of which will be obvious to those skilled in the art, from the following description.

Figure 2:
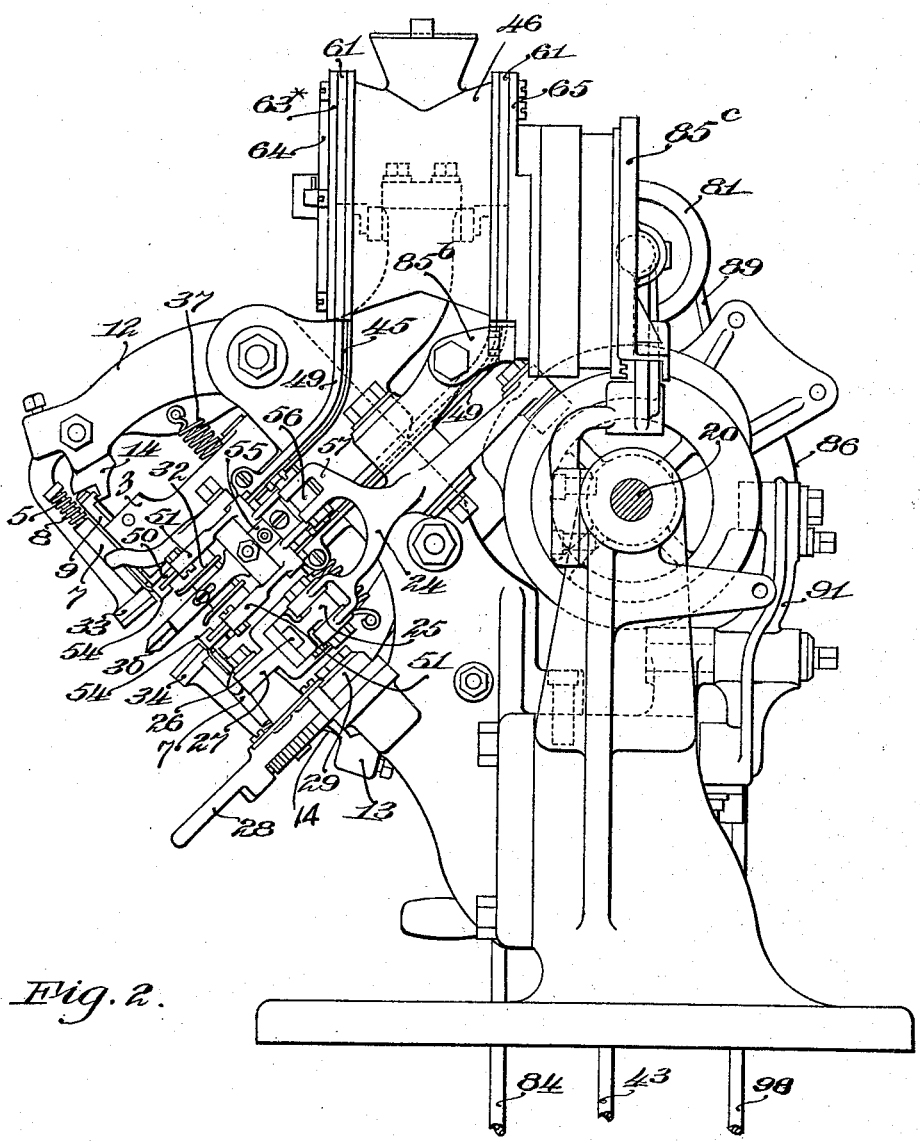
Figure 11:
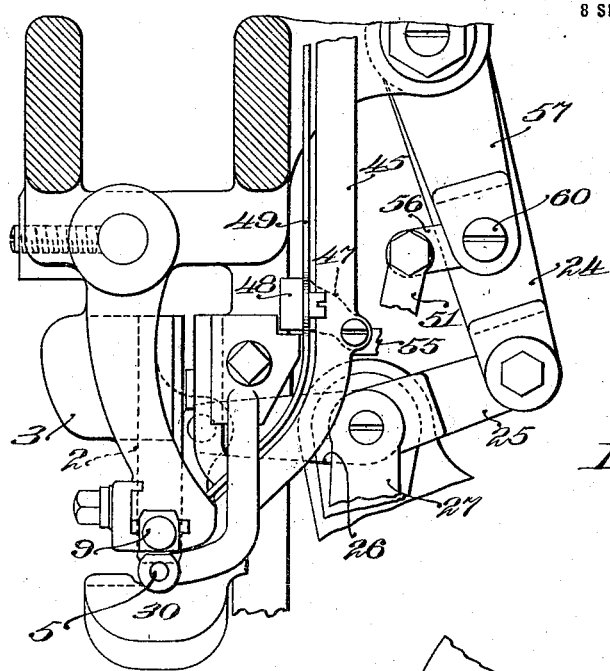
Figure 12:
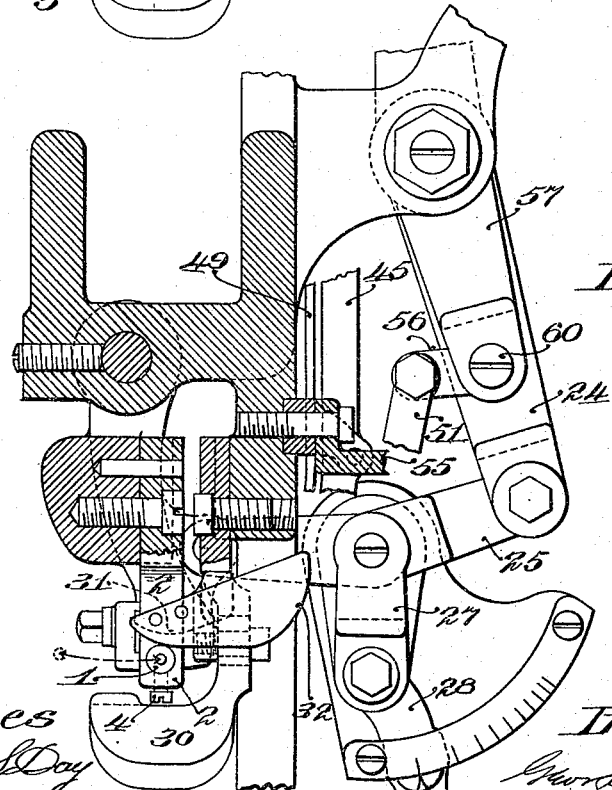

A lacing hook setting machine embodying the various features of the present invention in their preferred form is illustrated in the accompanying drawings, in which Figure 1 is a view in elevation of one end of the machine; Fig. 2 is a view in elevation of the other end of the machine with the hand pulley at the end of the driving shaft removed and the driving shaft shown in section; Fig. 3 is a plan view of the machine looking down from above at an angle of 45° to the vertical; Fig. 4 is a view in rear elevation of the machine; Fig. 5 is a detail view partly in section of the rear end of one of the levers for actuating the hook-setting plungers; Fig. 6 is a detail view of a portion of the mechanism under the control of the operator for actuating the work-holding clamps to allow work to be inserted in and removed from the machine; Fig. 7 is a plan view of the treadle mechanism at the base of the machine from which the operation of the machine is controlled; Fig. 8 is a view in front elevation of the mechanism illustrated in Fig. 7; Fig. 9 is a detail view in side elevation, partly in section, of the up-setting dies, the hook-setting plungers and the parts associated therewith; Fig. 10 is a view in front elevation of the parts illustrated in Fig. 9; Fig. 11 is a detail plan view of the parts illustrated in Figs. 9 and 10, with the lever for actuating the upper hook-setting plunger omitted and also showing a portion of the mechanism for actuating the up-setting dies to feed the work; Fig. 12 is a detail plan view similar to Fig. 11, with certain of the parts shown in section; Fig. 13 is a detail plan view similar to Fig. 3, illustrating particularly the mechanism for transferring the hooks from the raceways to the up-setting plungers; and Fig. 14 is a detail view of a portion of the mechanism illustrated in Fig. 3, illustrating the position of the parts when the feeding fingers are in retracted position.

The up-setting dies are indicated at 1 and, as shown, are two in number, and are arranged in axial alinement with each other on an arm or tongue 2 projecting from a frame 3, the dies being oppositely disposed with relation to each other and being secured in the arm 2 by means of a set-screw 4. The arm 2 is adapted to extend between two layers of material so that the up-setting dies can be located between the layers of material and coöperate with hook-setting dies to set hooks in both layers.

The hook-setting dies which coöperate with the up-setting dies comprise plungers 5 provided at their inner ends or at the ends adjacent the up-setting dies, with ribs or flanges 6 extending across the line of feed and adapted to enter the slot between the head and barrel of a hook. These plungers may, therefore, be termed hook holders or carriers. The plungers 5 are reversely arranged with relation to each other and are mounted to move toward and from the up-setting dies in guideways formed in blocks 7 rigidly secured to the main frame of the machine. The plungers are normally held in retracted position by means of springs 8 coiled around the plungers and interposed between the blocks 7 and nuts on the outer ends of the plungers.

Each hook-setting plunger 5 is forced toward its coöperating up-setting die by means of a plunger 9, the inner end of which is recessed as indicated in Fig. 9 to embrace the head of a hook upon the flange 6 of the up-setting plunger, and which when forced toward the flange of the plunger engages the flange and forces the plunger toward the hook-setting die. Each plunger 9 is provided with a spring-pressed pin 10, the movement of which with relation to the plunger is limited by a cross-pin 11 engaging a groove formed in the side of the pin 10. As the plungers 9 are forced toward the flanges 6 of the hook-setting plungers, the pins 10 engage the heads of the hooks and hold the hooks in position during the setting operation. The ends of the pins 10 which engage the heads of the hooks are concaved and serve to accurately center the hooks. The plungers 9 are mounted to reciprocate in guideways formed in arms projecting from the frame 3 above and below the arm 2 in which the up-setting dies are mounted.

Reciprocating movements are imparted to the plungers 9 at the proper times during the operation of the machine by means of bell crank levers 12 and 13 pivotally mounted upon the main frame of the machine and provided at their forward ends with blocks 14 which engage the outer ends of the plungers. Each block 14 is provided with a shoulder 15 adapted to bear upon the outer end of a plunger 9, as best illustrated in Fig. 9, and with a projection 16 adapted to extend beneath a projection 17 on the plunger. The plungers are thus positively reciprocated in both directions from the levers 12 and 13. In order to vary the extent of the movements imparted to the plungers 9 as may be desired, the blocks 14 are adjustably secured to the levers 12 and 13 by means of adjusting worms 18 journaled in the levers and meshing with teeth upon the blocks, and by means of bolts 19 passing through elongated slots in the blocks. The inner ends of the levers are provided with intermeshing teeth, and the lever 13 is provided with a rearwardly projecting arm upon which is mounted a cam roll engaging the groove of a cam secured upon the main driving shaft 20 of the machine. Both levers 12 and 13 are thus actuated from the same cam on the driving shaft, and the plungers 9 are reciprocated toward and from each other simultaneously. In order to prevent injury to the parts in case a hook is not in proper position when the plungers are actuated to set the hooks, the cam roll, instead of being mounted directly upon the lever 13, is mounted upon an arm 21 (see Fig. 5) pivotally connected to the lever so as to be capable of a slight movement with relation thereto, and is acted upon by a stiff coiled spring 22 interposed between the inner end of the arm and a screw 23 having a screw-threaded engagement with the lever.

The feeding movement of the work to properly space the hooks in the two layers of material is produced by moving the up-setting dies laterally, and to enable the dies to be so moved the frame 3 is pivotally mounted upon the main frame of the machine so as to be capable of a lateral swinging movement. The lateral swinging movements are imparted to the frame 3 by means of a cam-actuated lever 24 pivotally mounted upon the main frame of the machine and connected at its forward end to the frame 3 by means of links 25 and 26. The links 25 and 26 are pivotally connected together, and are also pivotally connected to an arm 27 pivotally mounted upon a feed-regulating arm 28, which arm is pivotally mounted at 29 (see Fig. 2) upon the main frame of the machine. The lateral feeding movement of the frame 3 takes place after the hooks have been set and before the hook-setting plungers are retracted, and during the feeding movement of the frame 3 the plungers 9 and pins 10 move laterally in the line of feed with the up-setting dies. The hook-setting plungers 5, however, being mounted upon a fixed portion of the machine frame, are not moved laterally during the lateral movement of the frame 3. The up-setting dies remain in engagement with the hooks and act to feed the work, the hooks at the same time being removed sidewise from the hook-setting plungers, which, as soon as the plungers 9 pass out of engagement therewith, are returned to their original retracted position by the springs 8. During the continued feeding movement of the up-setting dies after the hooks have been removed from the hook-setting plungers, the hooks are held in engagement with the up-setting dies by the spring-pressed pins 10 in the plungers 9. At the completion of the work-feeding movement the plungers 9 are retracted and the frame 3 returns to its original position with the plungers 9 and the up-setting dies in line with the flanges 6 of the hook-setting plungers.

The work is guided and held in the proper position as it is fed through the machine by means of a guide-plate 30 which is secured to a stationary portion of the machine frame and by means of edge guides 31 adjustably secured to the guide-plate and provided with overhanging wings 32. The guide-plate 30 extends in front of the arm 2 in which the up-setting dies are mounted and extends beyond the up-setting dies in the direction of feed, and is provided in its rear edge with a slot as indicated in Figs. 9 and 12, which receives the end of the screw 4 during the lateral movements of the frame 3. Coöperating with the guide-plate 30 are two clamping jaws 33 and 34 located respectively above and below the guide-plate. These clamping jaws are formed upon the forward ends of bell crank levers 35 and 36 pivotally mounted upon the main frame of the machine and having their inner ends connected so that the two levers are actuated in unison. The levers are connected by a coiled spring 37 which acts to move the clamping jaws into engagement with the guide-plate and the lever 36 is provided with a rearwardly extending arm in which is mounted a cam roll 38 which engages the periphery of a cam upon the driving shaft 20, the action of the cam being to actuate the levers 35 and 36 to open the jaws 33 and 34. While the machine is in operation, the clamping jaws 33 and 34 clamp the work against the guide-plate at all times except during the feeding of the work, the clamping jaws being in engagement with the work during the setting of the hooks and during the return movement of the up-setting dies. To allow work to be inserted in and removed from the machine, it is necessary that the jaws 33 and 34 be moved away from the guide-plate while the hook-setting plungers are in their retracted position. In the machine illustrated in the drawings, mechanism under the control of the operator is provided for moving the clamping jaws away from the guide-plate automatically when it is desired to insert work in the machine and for moving them toward the guide-plate after work has been inserted and before the hook-setting plungers are actuated. As illustrated (see Fig. 1), this mechanism consists of a lever 39, one end of which extends into a position to engage a projection 40 on the lever 36, and the other end of which is provided with an arm 41 pivotally mounted thereon, which is connected by a spring 42 to the lever 39 and by a rod 43 to a foot treadle, and which is provided with a cam roll 44 arranged to contact with a projection on one of the cams secured to the driving shaft. The spring 42 tends to hold the arm 41 in such position that the projection on the cam will engage the roll and actuate the lever 39 to separate the clamping jaws 33 and 34 and the projection on the cam is so placed that it engages the roll 44 while the hook-setting plungers are in their retracted position. In starting the machine into operation the rod 43 is depressed, as will be hereinafter described, and thus the arm 41 is swung against the tension of spring 42 and the spring 37 permitted to close the jaws 33 and 34 upon the work. While the machine is in operation the rod 43 remains depressed, and consequently the lever 39 is not actuated. When, however, the machine is stopped, the rod 43 is allowed to rise, the roll 44 is brought into the path of movement of the cam, and as the machine comes to rest the lever 39 is actuated and the clamping jaws 33 and 34 are separated.

The hook-setting dies or hook holders 5 are automatically supplied with hooks at the proper times during the operation of the machine by mechanism comprising a hopper in which the hooks are placed loosely, raceways leading from the hopper to the setting dies, a rotary brush which sweeps the hooks from the hopper into the raceways and hook-separating and feeding devices which transfer the hooks from the raceways to the required position between the setting dies.

The raceways are indicated at 45, and consist of plates secured at their upper ends to the hopper 46 and supported near their lower ends by arms 47 projecting from a block 48 secured to the main frame of the machine. The plates 45 are adapted to enter the space between the head and barrel of a hook and thus support the hooks as they pass sidewise along the plates from the hopper to the setting dies, the hooks as they approach the hook-setting dies being oppositely disposed with relation to each other so as to be readily transferred from the raceways to the flanges of the hook-setting plungers or hook carriers. As the hooks pass along the plates 45 under the force of gravity, they are held upon the plates and guided by guard plates 49 arranged at right angles to the plates 45 and separated therefrom a sufficient distance to form a slot to receive the necks of the hooks. The guard plates are secured to the hopper at their upper ends and near their lower ends are secured to the block 48.

The mechanism for separating the hooks and for transferring them sidewise from the raceways to the required position on the flanges 6 of the hook-setting plungers, is best illustrated in Figs. 13 and 14. When the hook-setting plungers are in retracted position, the flanges 6 of the plungers are in line with the plates 45 and in effect form extensions of the plates. The hooks are transferred from the raceways to the flanges of the hook-setting plungers when the plungers are in their retracted position by means of feeding fingers 50 which are arranged to reciprocate in the direction of the line of feed along the lower ends of the plates 45 and engage the body portion of the lowermost hook on each plate. Each finger 50 is pivotally mounted upon the lower end of a lever 51 and is provided with a rearwardly extending projection which is acted upon by a spring-pressed pin 52 carried by the lever 51, the object of this construction being to allow the ends of the fingers 50 which engage the lacing hooks to move in substantially a straight line. The fingers are guided in their movements by straight portions 53 of the outer edges of the plates 45, which portions of the plates are embraced by flanges 54 on the fingers. The levers 51 are pivotally mounted upon a bracket 55 secured to the block 48 and projecting beyond the plates 45, and are pivotally connected at their upper ends by means of a link 56 to an arm 57 integral with the lever 24. The feeding fingers 50 are thus actuated from the lever which actuates the up-setting dies to feed the work, and the connections between the lever 24 and the fingers are such that during the feeding movement of the up-setting dies the hook-feeding fingers are retracted, and during the return movement of the up-setting dies to their original position between the hook-setting plungers, the hook-feeding fingers are advanced. When the hook-feeding fingers are in their retracted position as indicated in Fig. 14, the lowermost hooks of the raceway are held in position by means of spring-pressed latches 58 pivotally mounted on brackets secured to the plates 45. As the feeding fingers advance, the lowermost hooks are engaged by the forward ends, or heads, of the fingers and moved to the required position on the flanges of the hook-setting plungers, as indicated in Fig. 13. It will be noted that the pivots of the latches 58 are at the ends of the latches disposed at the forward side of the plunger flanges 6, that is, on the end of the latch past which the hook moves on entering on the plunger flange. The latches are thus permitted to yield away from the plunger flanges under the pressure from the entering hooks. As the hooks are moved on to the flanges of the hook-setting plungers, the latches 58 are displaced rearwardly and bear upon the necks of the hooks and thereby hold the necks of the hooks against the edges of the flanges 6. The hooks which remain on the raceways are held in position, at this point in the operation of separating and feeding the hooks, by the engagement of the lowermost hooks on the raceways with the inner surfaces of the shank portions of the feeding fingers (see Fig. 13). The feeding fingers remain in their advanced position while the hooks are being set and are not retracted a sufficient distance to release the lowermost hooks on the raceways until the hooks which have been set are removed by the feeding movement of the work from the hook-setting plungers. The latches 58 are thus allowed to return to their original position before the feeding fingers release the lowermost hooks on the raceways, and when the fingers are retracted the lowermost hooks are allowed to move downwardly on the raceways until stopped by the latches. During the movement of the hooks from the raceways to the flanges of the hook-setting plungers, the hooks are guided by the engagement of the spring-pressed latches with the necks of the hooks, and also by the engagement of the projecting ends of the guard-plates 49, the ends of the guard-plates being projected beyond the ends of the plates 45 and above the latches 58, as is clearly shown in Figs. 9, 10, 13 and 14. The projecting ends of the guard-plates 49 form rigid guides which effectually prevent the hooks from being rotated as they are transferred from the plates 45 to the flanges of the hook-setting plungers by the feeding fingers. The feeding fingers push the hooks into the required position on the flanges of the hook-setting plungers, and the correct positioning of the hooks is insured by the latches 58, the projecting ends of the guard-plates 49 and the spring-pressed pins 10 in the actuating plungers 9. The latches 58 hold the necks of the hooks pressed against the edges of the flanges of the hook-setting plungers during a portion of the movement of the plungers toward the up-setting dies, and in order that the latches may remain in engagement with the hooks as long as possible they are provided on the sides adjacent the up-setting dies with projecting flanges 59. To adapt the hook-feeding fingers for operation upon hooks of different sizes, an adjustable connection is provided between the link 56 and the arm 57, this connection (as illustrated in Fig. 13) consisting of a pivot pin 60 eccentrically mounted in the arm 57. The adjustment of this pin changes the position of the ends of the hook-feeding fingers when at the limit of their forward movement, and thus adapts the fingers for operation upon hooks having different sized heads.

The hopper 46 (Figs. 1 to 4) in which the hooks are placed loosely, and from which they are delivered to the raceways, comprises a body portion substantially cylindrical in shape but smaller at the center than at the ends so that the hooks placed in the hopper tend to fall toward the ends of the hopper. At each end of the hopper is a ring 61, the inner surface of which is cylindrical and forms a continuation of the inner surface of the body portion. The forward end of the hopper is closed by a ring 63* and a removable plate 64 and the rear end of the hopper is closed by a plate 65. These plates are provided with journals for a brush shaft which supports a brush within the hopper for sweeping the hooks to the raceways. Suitable mechanism for operating the brush in a peculiar and novel manner is connected thereto and operated from a pinion at one end of a shaft 80 journaled in brackets extending upwardly from the frame of the machine. At the other end of the shaft a driving pulley 81 is provided and a clutch mechanism by means of which the shaft can be clutched to the pulley. The clutch mechanism may be of any suitable or well-known construction, and for this reason has not been illustrated in the drawings. The operation of the clutch mechanism is controlled by means of a rock shaft 82 which is rocked in one direction by a coiled spring 83 and in the other direction by a rod 84, the upper end of which is connected to an arm 85 secured to the rock shaft, and the lower end to a foot treadle, the depression of the rod serving to clutch the shaft 80 to the pulley 81, and the movement of the rock shaft 82 under the influence of the spring 83 serving to disconnect the shaft from the pulley.

The hopper 46 is supported on the frame of the machine by means of a lug 85ᵃ projecting from the body portion of the hopper, which lug is bolted to a projection from the frame of the machine, and by means of a bracket 85ᵇ bolted to the frame of the machine and to the plate 65. The driving mechanism for the brush shaft within the hopper is closed in by a casing 85ᶜ supported from one of the brackets in which the shaft 80 is journaled.

The features of the invention just described, relating to the mechanism for supplying and delivering fasteners to the setting devices, are not claimed herein as they form the subject matter of a divisional application filed March 2, 1911, Serial No. 611,774, patented December 17, 1912, No. 1,047,202.

The main driving shaft of the machine is driven from a belt pulley 86 located at one end of the shaft. This pulley is driven by a belt which passes over the pulley and over a belt-tightening pulley 87 of well-known construction. A belt pulley 88 is secured to or formed integral with the pulley 86, and a belt 89 passes over this pulley and over the pulley 81 from which the shaft 80 is driven. The pulley 86 is rotated constantly, and a suitable clutch and brake mechanism is provided by means of which the shaft 20 may be clutched to the pulley 86 or disconnected therefrom and its rotation stopped. This clutch and brake mechanism is not illustrated in the drawings, as it may be of any suitable or well-known construction, and forms no part of the present invention.

Any suitable mechanism may be provided for controlling the operation of the clutch and brake mechanism, and in the machine illustrated in the drawings a mechanism is provided which is quite similar in its construction and mode of operation to mechanism disclosed in applicant's prior U. S. Patent No. 934,066 for an eyelet setting machine, dated Sept. 14, 1909.

This mechanism comprises a clutch-actuating lever 90 pivoted to the frame of the machine, a cam-actuated lever 91 also pivoted to the frame of the machine, and a toggle lever consisting of links 92 and 93 connecting the lower ends of the levers 90 and 91. The lever 91 is provided at its upper end with a cam roll 94 which is arranged to be engaged by a projection on one of the cams secured to the main driving shaft, and the lever 90 is acted upon by a strong coiled spring 95 supported in the frame of the machine. When the links 92 and 93 of the toggle lever are moved out of line with each other the spring 95 acts upon the lever 90 to clutch the shaft 20 to the pulley 86, and when the links of the toggle lever are returned to the position in which they are in line with each other, the lever 90 is actuated from the cam on the driving shaft through the lever 91 and the links of the toggle lever to disconnect the driving shaft from the pulley and stop its rotation. The cam on the driving shaft from which the clutch-actuating lever 90 is operated is so arranged that the driving shaft comes to rest when the hook-setting plungers are in their retracted position and the up-setting dies are in position between the plungers. The links 92 and 93 of the toggle lever connecting the levers 90 and 91 are moved out of line with each other by means of an arm 96 pivotally mounted at the point where the links 92 and 93 are connected together. The arm 96 is acted upon by a coiled spring 97 connected to the arm and to the frame of the machine, and the arm is connected to a foot treadle by means of a rod 98. Between the arm 96 and the link 93 a clutch is provided consisting of a roll 99 located between the adjacent surfaces of hardened plates 100 secured to the arm and to an extension of the link. When the links are in line with each other, or nearly so, and the arm 96 is held in its raised position by the spring 97, the links are prevented from moving out of line with each other by the engagement of the roll 99 with the plates 100. When, however, the arm 96 is actuated by the rod 98, it is first swung about its pivot to release the roll 99 from engagement with the plate 100 on the arm, and a movement of the links out of line with each other is permitted during the continued actuation of the arm. The links of the toggle lever are returned to a position in line with each other by means of a spring 101 connected to the extension of the link 93 and to the frame of the machine, the movement of the links under the force of the spring being limited by an adjustable stop-screw 102 which contacts with a fixed stop on the frame of the machine.

The operation of the machine is controlled by the operator by means of the treadle mechanism illustrated in Figs. 7 and 8. Referring to these figures, 103 indicates a rock shaft upon which two treadles 104 and 105 are mounted, the treadle 104 being rigidly secured to the rock shaft and the treadle 105 being mounted to oscillate freely thereon. Arms 106 and 107 project from the rock shaft and are provided with pins 108 and 109. The pin 108 extends over the bent lower ends of the rods 84 and 98 and the pin 109 extends over the bent lower end of the rod 43, so that when the shaft 103 is rocked, all three rods 43, 84 and 98 are depressed. The rod 98 extends some distance below the pin 108, so that during the first portion of the rocking movement of the shaft 103 the rod 98 is not actuated. As a result of this construction, the rod 43 is actuated before the rod 98, and thus the work-clamping jaws 33 and 34 are caused to move into engagement with the work before the driving shaft is thrown into operation. The shaft 80, from which the mechanism for actuating the brush in the hopper is driven, is connected to its driving pulley each time the machine is thrown into operation, and is disconnected therefrom each time the machine is thrown out of operation. The brush in the hopper is thus rotated under normal conditions only while the machine is in operation. It is sometimes desirable, however, to rotate the brush when the rest of the machine is not in operation in order to supply the raceways with the requisite number of hooks. To enable the brush to be so rotated, the treadle 105 is connected to the rod 84 by means of a chain 110, an actuation of the treadle 105 serving merely to throw the brush in the hopper into operation while an actuation of the treadle 104 throws the entire machine into operation.

The operation of the machine has been indicated in connection with the description above given of the construction and arrangement of the various parts, and will be readily understood by those skilled in the art without a separate description thereof. The shape to be given to the various cam grooves and surfaces will be obvious to those skilled in the art, and these grooves and surfaces have not been illustrated in the drawings as they can be readily produced by any designer skilled in the construction of hook-setting and analogous machines.

The invention having been thus described, what is claimed is:—

1. A hook-setting machine, having, in combination, reversely arranged up-setting dies, reversely arranged dies coöperating with the up-setting dies to set hooks in two sheets of material having their surfaces oppositely disposed, raceways for delivering hooks to each of the hook setting dies, and means coöperating with each of the raceways to engage the outer surface of a hook and feed it to setting position between each up-setting die and its coöperating die.

2. A hook-setting machine, having, in combination, reversely arranged up-setting dies, reversely arranged dies coöperating with the up-setting dies to set hooks in two sheets of material having their surfaces oppositely disposed, raceways having flanges to enter the space between the head and barrel of the hooks leading to the dies, and means for transferring a hook from each raceway flange to setting position between each up-setting die and its coöperating die by a movement in continuation of the direction of movement of the hook as it leaves the flange.

3. A hook-setting machine, having, in combination, oppositely disposed up-setting dies, oppositely disposed dies coöperating with the up-setting dies to set hooks in two layers of material, means for feeding a hook to the required position between each up-setting die and its coöperating die, and means for moving the up-setting dies to feed the work.

4. A hook-setting machine, having, in combination, oppositely disposed up-setting dies, oppositely disposed dies coöperating with the up-setting dies to set hooks in two layers of material, means for feeding a hook to the required position between each up-setting die and its coöperating die, means for moving the up-setting dies to feed the work and remove the hooks from the coöperating dies, and means for holding the hooks in engagement with the up-setting dies during their feeding movement.

5. A hook-setting machine, having, in combination, oppositely disposed up-setting dies, oppositely disposed hook-setting plungers coöperating therewith to set hooks in two layers of material, means for feeding a hook to each hook-setting plunger, actuating plungers for the hook-setting plungers arranged to force the hook-setting plungers toward the up-setting dies, spring-pressed pins carried by the actuating plungers and arranged to bear upon the hooks, and means for moving the up-setting dies and actuating plungers to feed the work and remove the hooks from the hook-setting plungers.

6. A hook-setting machine, having, in combination, oppositely disposed up-setting dies, oppositely disposed dies coöperating with the up-setting dies to set hooks in two layers of material, a pair of stationary raceways leading to the dies, a pair of coöperating feeding fingers movable relatively to the raceways for transferring lacing hooks from the raceways to the dies, and a common actuating mechanism for operating said fingers simultaneously.

7. A hook-setting machine, having, in combination, oppositely disposed up-setting dies, oppositely disposed dies coöperating with the up-setting dies to set hooks in two layers of material, raceways leading to the dies, feeding fingers for transferring a hook from each raceway to the required position between each up-setting die and its coöperating die, and a lever and suitable connections to said lever for actuating the feeding fingers and for actuating the up-setting dies to feed the work.

8. A hook-setting machine, having, in combination, an up-setting die, a hook-setting plunger coöperating therewith, a raceway leading to the plunger, a feeding finger for transferring a hook from the raceway to the plunger, and means for adjusting the feeding finger for operation upon hooks of different sizes.

9. A hook-setting machine, having, in combination, an up-setting die, a hook-setting plunger provided with a flange to enter the space between the head and the base of a hook, a raceway leading to the hook-setting plunger, a feeding finger arranged to engage the head of a hook and transfer the hook from the raceway to the flange of the hook-setting plunger, and a stationary guide arranged adjacent the flange of the hook-setting plunger in position to engage the neck of the hook and prevent the hook from turning while it is being transferred.

10. A hook-setting machine, having, in combination, hook-setting dies, a raceway leading to the dies, a yielding latch arranged to engage the neck of the lowermost hook on the raceway and retain the hook thereon, and a feeding finger having a head and a shank operating longitudinally of the raceway for transferring the lowermost hook from the raceway to the dies arranged to engage on the opposite side of the hook with its head and acting while in its advanced position to retain the remaining hooks on the raceway with its shank.

11. A hook-setting machine, having, in combination, an up-setting die, a die coöperating therewith to set a hook, and means for actuating the up-setting die to feed the work and remove the hook from the coöperating die.

12. A hook-setting machine, having, in combination, an up-setting die, a hook-setting plunger coöperating therewith to set a hook, means for actuating the up-setting die to feed the work and remove the hook from the hook-setting plunger, and means for holding the hook in engagement with the up-setting die during its feeding movement.

13. A hook-setting machine, having, in combination, an up-setting die, a hook-setting plunger coöperating therewith to set a hook, an actuating plunger movable with relation to the hook-setting plunger arranged to engage the hook-setting plunger and force the hook-setting plunger toward the up-setting die, and a spring-pressed pin carried by the actuating plunger and arranged to bear upon the hook.

14. A hook-setting machine, having, in combination, an up-setting die, a hook-setting plunger coöperating therewith provided with a flange to enter the space between the head and the base of a hook, a raceway leading to the hook-setting plunger, means for transferring a hook from the raceway to the flange of the hook-setting plunger, and a yielding guide separate from the plunger arranged to bear upon the neck of the hook while on the flange.

15. A hook-setting machine, having, in combination, an up-setting die, a hook-setting plunger coöperating therewith provided with a flange to enter the space between the head and the base of a hook, a raceway leading to the hook-setting plunger, means for transferring a hook from the raceway to the flange of the hook-setting plunger, and a yielding latch arranged to engage the lowermost hook on the raceway and bear against the hook while being transferred to the flange of the hook-setting plunger.

16. The combination with fastener setting and work-feeding devices, of work-clamping devices, mechanism for actuating the clamping devices to alternately clamp and release the work, and means under the control of the operator acting automatically to actuate the clamping devices to allow work to be presented to the fastener setting devices.

17. The combination with oppositely disposed up-setting dies, oppositely disposed dies coöperating therewith to set fasteners in two layers of material, means for actuating the up-setting dies to feed the work, and a guide-plate adjacent the up-setting dies, of work-holding clamps coöperating with the guide-plate to alternately clamp and release the work, and means under the control of the operator acting automatically to actuate the clamps to allow work to be presented to the fastener setting dies.

18. The combination with fastener setting devices, actuating mechanism therefor, a hopper, and a raceway leading from the hopper to the setting devices, of mechanism for delivering fasteners from the hopper to the raceway, mechanism controlled by the operator for throwing into and out of operation concurrently the mechanism for delivering fasteners from the hopper to the raceway and the mechanism for actuating the fastener setting devices, and means for throwing the mechanism for delivering fasteners from the hopper to the raceway into and out of operation independently.

19. A hook-setting machine, having, in combination, an upsetting die, a hook-setting plunger coöperating therewith, a raceway leading to the plunger, a feeding finger for transferring a hook from the raceway to the plunger and for locating the hook in proper position on the plunger, and mechanism for actuating the finger having provision for adjustment to adapt the finger for operation upon hooks of different sizes.

20. A hook-setting machine, having, in combination, an upsetting die, a hook-setting plunger coöperating therewith provided with a flange to enter the space between the head and the base of a hook, a raceway leading to the plunger, a feeding finger arranged to reciprocate on one side of the line of hooks in the raceway in the direction in which the hooks are fed, and means for actuating the finger to engage the head of the lowermost hook in the raceway and move the hook laterally from the raceway onto the plunger.

21. A hook-setting machine, having, in combination, a work table, a pair of up-setting dies one on each side of said table, a hook die opposite each up-setting die and coöperating therewith to set hooks in two layers of material, a pair of raceways, means for separating hooks from the raceways and presenting them to the dies, and means for imparting proper movements to the up-setting and hook dies to set hooks and thereafter to feed the work.

22. A hook-setting machine, having, in combination, reversely arranged up-setting dies, reversely arranged dies coöperating with the up-setting dies to set hooks in two sheets of material having their surfaces oppositely disposed, and means independent of the die parts for engaging and feeding two hooks to the required positions between each up-setting die and its coöperating die.

23. A hook-setting machine, having, in combination, oppositely disposed up-setting dies, oppositely disposed dies coöperating with the up-setting dies to set hooks in two layers of material, raceways leading to the dies, and means independent of the die parts for engaging and transferring a hook from each raceway to the required position between each up-setting die and its coöperating die.

24. A hook-setting machine, having, in combination, oppositely disposed up-setting dies, oppositely disposed dies coöperating with the up-setting dies to set hooks in two layers of material, means independent of the die parts for engaging and feeding a hook to the required position between each up-setting die and its coöperating die, and means for moving the up-setting dies to feed the work.

25. A machine for setting shoe fasteners, having, in combination, fastener inserting mechanism, fastener supplying mechanism including a raceway, separate trains of operating mechanism for said fastener inserting and supplying mechanisms, a controlling device for each train, an actuator operatively connected with both of said controlling devices to start both mechanisms from positions of rest, and a second actuator operatively connected with but one of said controlling devices.

26. A machine for setting shoe fasteners, having, in combination, fastener inserting mechanism and operating means therefor, fastener supplying mechanism and operating means therefor, power driven actuating means, and means for connecting both of said mechanisms concurrently, or the fastener supplying mechanism alone, to said actuating means to be started thereby from positions of rest.

27. A machine for inserting fasteners, having, in combination, fastener inserting and fastener supplying mechanisms, a driving shaft for each of said mechanisms, a clutch on each shaft for controlling the operation of said mechanisms, an operative connection between the driving members of the clutches for driving one shaft from the other, and means for controlling said clutches permitting operation of said mechanisms in unison or of said fastener supplying mechanism alone while the fastener inserting mechanism remains at rest.

28. A hook setting machine, having, in combination, a raceway comprising a plate to enter the space between the head and barrel of the hook, a hook holder or carrier adjacent the end of the raceway and forming an extension of the plate, means to deliver hooks to the carrier from the raceway, an up-setting die, means for setting the hook on the carrier thereagainst, and means for feeding the work relatively to the carrier after the hook has been set thereby removing the clenched hook from the carrier.

29. A hook setting machine, having, in combination, a raceway, a hook holder or carrier normally in hook receiving position adjacent the end of the raceway, means to deliver hooks to the carrier from the raceway, an upsetting die, means to move the carrier with a hook thereon toward the upsetting die to set the hook, and means to remove the clenched hook from the carrier while the carrier remains in setting position.

30. A hook setting machine, having, in combination, a hook hopper having a connected raceway comprising a plate to enter the space between the head and barrel of the hook, an up-setting die, a hook holder or carrier movable from receiving position at the end of the raceway plate to setting position at the die, means to deliver a hook to the carrier while at the raceway, means to move the carrier past the raceway to set the hook, and means to remove the hook from the carrier by a movement in the direction of feed after it has been set.

31. A hook setting machine, having, in combination, means for setting hooks including a movable hook holder or carrier, a stationary raceway; means to deliver a hook from the raceway to the carrier, and means to remove the hook from the carrier after it has been set, said two last named means acting to move the hook substantially in the direction of the line of feed.

32. A hook setting machine, having, in combination, means for setting hooks including a movable hook holding or carrying flange extending across the line of feed, a stationary raceway for delivering a hook sidewise to said flange before the setting operation, and means to remove the hook sidewise from said flange after the setting operation.

33. A hook-setting machine, having, in combination, a raceway comprising a plate to enter the space between the head and barrel of a hook, an up-setting die, a hook-setting plunger coöperating therewith provided with a flange to enter the space between the head and barrel of the hook, said flange being normally at the end of the raceway with its edge forming an extension of the edge of the raceway plate, means for transferring a hook from the raceway plate to the flange, a guide mounted on the raceway constructed and arranged to engage the neck of the hook as it is transferred, and means to move the hook-setting plunger past the raceway and guide to set the hook.

34. A hook-setting machine, having, in combination, an up-setting die, a hook-setting plunger coöperating therewith having a hook-receiving flange, a raceway leading to the plunger flange, means for transferring a hook from the raceway to the plunger flange without altering the direction of movement of the hook after it leaves the raceway, a hook guide to correctly position the hook on the flange, and means to move the hook-setting plunger past the end of the raceway and guide and toward the up-setting die to set the hook.

35. In a machine of the character described, a reciprocating hook holding die having a laterally extending flange adapted to receive each hook as fed to it from the raceway, and a spring pressed member pivoted at its entering end, the free end engaging the back of the hook to retain the same in position on the die.

36. A hook setting machine, having, in combination, oppositely disposed up-setting dies, oppositely disposed dies coöperating with the up-setting dies to set hooks in two layers of material, devices for delivering pairs of hooks to said dies, one hook of each pair for each set of coöperating dies, said pairs of hooks being disposed on said devices with their barrels pointing in opposite directions and with their heads pointing in the same direction, and means for engaging and feeding said pairs of hooks to setting position between each set of coöperating dies.

37. A hook setting machine, having, in combination, oppositely disposed up-setting dies, oppositely disposed dies coöperating with the up-setting dies to set hooks in two layers of material, two raceways leading to the dies for delivering pairs of hooks to said dies comprising parallelly arranged flanges to enter the space between the head and barrel of the hooks, means for supplying hooks to corresponding edges of said raceway flanges with their barrels pointing toward each other, and means for engaging and feeding said pairs of hooks to setting position between each set of coöperating dies.

38. A machine for setting lacing hooks or studs, having in combination, two reversely arranged setting anvils in line with each other, two opposed hook supporting plates coöperating therewith, and mechanism for feeding hooks onto said plates whereby two opposed hooks may be set.

39. A machine for setting lacing hooks and studs, having, in combination, two hook setting anvils reversely arranged in line with each other, two opposed hook supporting plates coöperating therewith, two guideways through which hooks are fed to the hook supporting plates, feed slides for transferring hooks from the guideways to the hook supporting plates, plungers carrying said hook supporting plates, mechanism for simultaneously reciprocating the plungers, and mechanism for simultaneously operating the feed slides.

40. A machine for setting lacing hooks or studs, having, in combination, an anvil plate provided with a hook setting anvil on each side arranged one in line with the other, two opposed hook supporting plates coöperating therewith, mechanism for feeding hooks onto said plates, and devices for positioning the two sides of a shoe upper on opposite sides of the anvil plate.

41. A machine for setting lacing hooks or studs, having, in combination, an anvil plate provided with a hook setting anvil on each side arranged one in line with the other, two opposed hook supporting plates coöperating therewith, and means for feeding the two sides of an upper on opposite sides of the anvil plate and maintaining them in fixed relation.

42. A machine for setting lacing hooks, or studs, having, in combination, an anvil plate provided with a hook setting anvil on each side arranged one in line with the other, two opposed hook setting plates, mechanism for feeding hooks onto said plates, mechanism for reciprocating said plates, and mechanism for causing a disengagement between said plates and hooks after the setting operation.

43. In a machine for setting lacing hooks, a hook support, means for coöperating therewith to set a hook, and hook engaging means for moving the hook relatively to said support while the support is in the hook, to feed the work automatically into position to receive the next hook so as to properly space the hooks in the work.

44. In a machine for setting lacing hooks, a hook support, an anvil having a feeding point, means for causing relative movement of the hook support and anvil to set a hook, and means for moving the anvil laterally while said feeding point is in the hook and while the hook support is in the hook to feed the hook along the hook support.

45. In a machine for setting lacing hooks, an anvil adapted to flare a hook, said anvil having a point for engaging the hook to feed the work, a carrier for moving said anvil to feed the work, means for imparting feeding movement to said carrier, and hook-engaging means for holding the hook on the feeding point during the feeding movement of the point.

46. In a machine for setting lacing hooks, an anvil, a carrier therefor, said anvil having a feeding point, and said carrier being movable laterally for feeding the work, means for moving the carrier to feed the work, hook-engaging means for supporting the hook in coöperative relation to said feeding point for feeding, said hook-engaging means and said anvil being capable of relative movement toward and from each other for flaring the hook, and means for imparting such relative movement to flare the hook.

47. A machine for setting lacing hooks, having, in combination, a hook support, means for coöperating therewith to set a hook, and means engaging in the barrel of the set hook for moving the hook to feed the work.

48. A machine for setting lacing hooks, having, in combination, a hook support, means for coöperating therewith to set a hook, hook engaging means, mechanism for actuating said means to move the hook relatively to the support while the support is in the hook to feed the work, and means for adjusting the throw of said actuating mechanism.

49. In a machine for setting lacing hooks, hook clenching devices including a hook support and means for coöperating therewith to set a hook, means for supporting and guiding the work to the hook clenching devices, and hook-engaging means for moving the hook relatively to the hook support while said support is in the hook to feed the work, said hook-engaging means coöperating with the work supporting and guiding means to automatically feed and guide the work into a position to receive the next hook so as to give the hooks a predetermined spacing in the work.

50. A machine for setting lacing hooks and the like in the upper of a boot or shoe, having, in combination, means adapted to set a lacing hook in said upper embodying a tool adapted to project into the barrel of said lacing hook during the setting operation, and mechanism adapted to move said tool laterally thereof after the setting operation and while said tool still projects into said barrel, whereby said upper may be fed to space said hooks.

51. A hook setting machine, having, in combination, a hook support, an upsetting die having a feeding point, means for causing relative movement of the hook support and die to set a hook, and means for moving the upsetting die laterally while said feeding point is in the hook to feed the hook.

52. A hook setting machine, having, in combination, reversely arranged upsetting dies, reversely arranged hook-setting dies coöperating with the upsetting dies to set hooks in two opposed sheets of material having their surfaces oppositely disposed, raceways leading to the hook setting dies, coöperating hook separating devices movable relatively to the raceways for delivering hooks from the raceways to the hook-setting dies, and actuating mechanism for operating said devices.

53. A hook setting machine, having, in combination, a support provided with two upsetting dies arranged one in line with the other, two opposed hook supporting plates coöperating therewith, mechanism for delivering hooks to said plates, and devices for positioning the two sides of a shoe upper at opposite sides of said support with the upsetting dies against the inner surfaces of the sides of the upper.

54. A machine for setting lacing hooks, having, in combination, two opposed sets of hook setting devices constructed and arranged to set hooks in two sheets of material having their surfaces oppositely disposed, and mechanism for delivering hooks to each set of hook setting devices.

55. A hook setting machine of the nature described comprising two upsetting dies facing in opposite directions, two coöperating hook setting devices having hook carriers, movably mounted carriages for said hook setting devices, and mechanism operating said carriages of both hook setting devices in unison.

56. A hook setting machine of the nature described comprising means for sustaining in operative position both edges of the two sides of a shoe upper arranged with their surfaces oppositely disposed, means for delivering two lacing hooks approximately simultaneously to said edges and setting said hooks, and means for simultaneously releasing said hooks when so set.

57. A hook setting machine of the nature described comprising means for sustaining a shoe upper, dies bearing respectively against the inner surfaces of both of the edge portions of said upper when so sustained and hook setting devices coöperating with said dies.

58. A hook setting machine of the nature described comprising means for sustaining two sides of a shoe upper with their edges extending in the same general direction, and two lacing hook carriers delivering to said upper from opposite directions.

59. A hook setting machine of the nature described comprising means for sustaining two sides of a shoe upper with their edges extending in the same general direction, two lacing hook carriers delivering to said upper from opposite directions, and means coöperating with said carriers to set said lacing hooks.

In testimony whereof I affix my signature, in presence of two witnesses.

GEORGE GODDU.

Witnesses:
 FRED O. FISH,
 ALFRED H. HILDRETH.

Copies of this patent may be obtained for five cents each, by addressing the "Commissioner of Patents, Washington, D. C."

Correction in Letters Patent No. 1,217,088.

It is hereby certified that in Letters Patent No. 1,217,088, granted February 20, 1917, upon the application of George Goddu, of Winchester, Massachusetts, for an improvement in "Machines for Setting Fasteners," an error appears in the printed specification requiring correction as follows: Page 2, line 65, for the compound word "hook-setting" read *up-setting;* and that the said Letters Patent should be read with this correction therein that the same may conform to the record of the case in the Patent Office.

Signed and sealed this 24th day of April, A. D., 1917.

[SEAL.]

F. W. H. CLAY,

*Acting Commissioner of Patents.*

Cl. 218—17.